United States Patent [19]

Zantzinger, Jr.

[11] 4,237,681

[45] Dec. 9, 1980

[54] MULTIPLE-ROW TOBACCO HARVESTING MACHINE

[76] Inventor: Richard C. Zantzinger, Jr., West Hatton Farm, Mt. Victoria, Md. 20661

[21] Appl. No.: 25,526

[22] Filed: Mar. 30, 1979

[51] Int. Cl.³ .............................................. A01D 57/00
[52] U.S. Cl. ..................................... 56/27.5; 56/192; 56/13.6
[58] Field of Search ..................... 56/27.5, 13.6, 13.8, 56/98, 192

[56] References Cited

U.S. PATENT DOCUMENTS

| 3,517,489 | 6/1970 | Alexandrino et al. | 56/13.7 |
| 4,099,364 | 7/1978 | Kanengieter et al. | 56/192 |
| 4,165,596 | 8/1979 | Duncan | 56/192 |

*Primary Examiner*—Robert A. Hafer

*Attorney, Agent, or Firm*—Sughrue, Rothwell, Mion, Zinn and Macpeak

[57] ABSTRACT

A wheeled frame or chassis is laterally stationary but movable longitudinally in rolling contact with the ground along several of a plurality of laterally spaced rows of tobacco plants. Vertical support bars depend from the frame to support at laterally spaced intervals corresponding to the rows, horizontal cutting discs mounted for rotation about vertical axes to sever the plants just above the ground. Guide plates affixed to the vertical supports bearing the cutting discs and overlying the discs lift the leaves of the plants and deflect the plants laterally towards each other for adjacent rows during the cutting, with the discs being driven in opposite directions for adjacent rows to cause the severed plants to fall with their butt ends extending rearwardly and with plants of adjacent rows falling on top of each other to facilitate subsequent pick-up.

9 Claims, 4 Drawing Figures

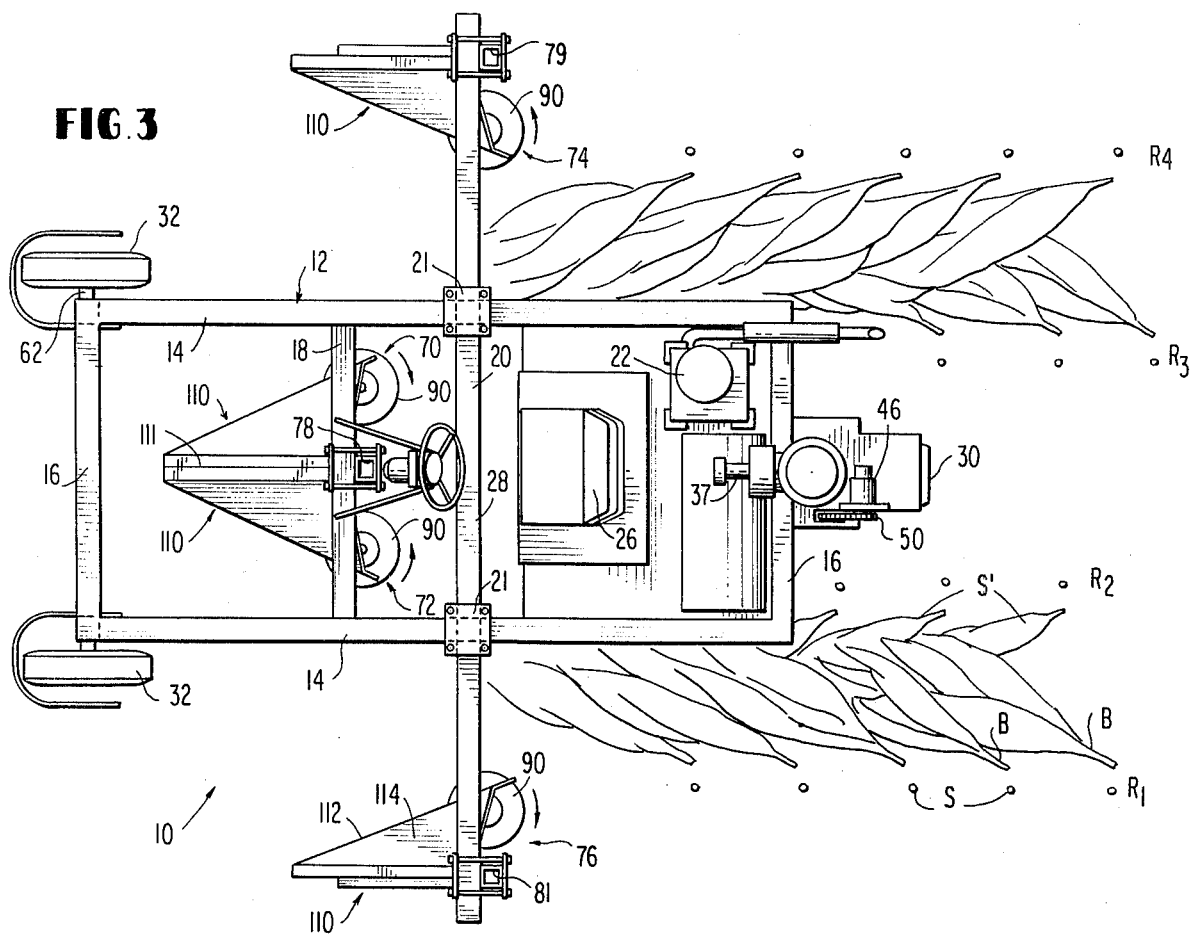
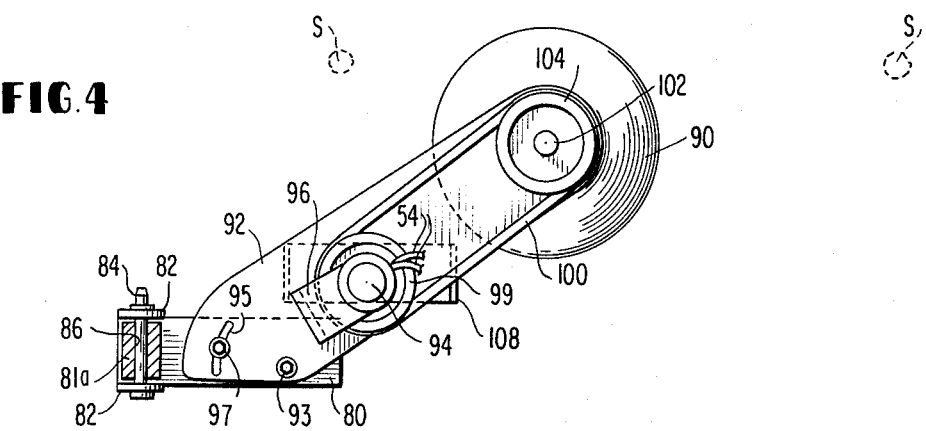

MULTIPLE-ROW TOBACCO HARVESTING MACHINE

FIELD OF THE INVENTION

This invention relates to the tobacco harvesters, and more particularly to the self-driven tobacco harvesters for cutting multiple rows of tobacco simultaneously and for orienting the severed plants and piling of the same to facilitate severed plant pick-up.

DESCRIPTION OF THE PRIOR ART

Manual harvesting of tobacco has been employed for centuries but is not only costly, but highly time consuming. Further, tobacco requires careful handling to prevent bruising or tearing of the leaves which reduces the quality of the tobacco when cured. Attempts have been made to develop automated or semi-automated harvesting machinery, particularly of the self-propelled type. Representative tobacco harvesting machines of this type normally provide for the stripping of certain of the leaves of the tobacco plants without severance of the plant and in such cases the machines may make multiple passes over a given time period to sever only those leaves which are then in condition for harvesting. U.S. Pat. Nos. 3,654,753 to Gervais; 3,834,137 to Long; and 3,962,850 to Moore, show such type machines, either self-driven or horse drawn. The machines which operate on a single row, as for instance in the Gervais patent involve complicated and expensive mechanisms for inducing vertical air drafts by way of electric motor driven fans at the top of a large vertical rectangular housing. This effects subsequent severance of certain of the leaves on the plant, the leaves being lifted to a conveying mechanism which convey the leaves to a storage receptacle remote from the cutting area. Such machines, simply exemplify the ability to provide a frame assembly bearing the necessary mechanism to achieve harvesting under such mode in which the elements are driven preferably from a central power source along with the vehicle itself, with the operator controlling movement by steering by one or more wheels of the vehicle. The Long and Moore patents exemplify in such machines, the ability to harvest tobacco leaves individually upon individual severance from multiple rows by the utilization of multiple chambers or their equivalent on each side of a central steering wheel driven vehicle bearing plural wheels disposed between multiple tobacco rows. Harvest is effected by leaf severance or stripping and conveying the leaves upwardly and rearwardly to a storage area remote from the cutting area.

In addition to individual leaf harvesting of the multiple leaves on each of the tobacco plants, historically, tobacco has been harvested, particularly in certain geographical areas such as in the State of Maryland, by cutting or severing of the plants from its root system just above the ground. Subsequently, the several plants are speared by a sharp pointed stick or the like at their butt ends which are then stored butt end upwardly within tobacco barns for drying and curing over the winter months after the summer harvest. While the work has been done manually since colonial time, with the harvester handling a cutting knife or the like to effect severance of the plants individually, row upon row, the nonavailability and high cost of manual labor has resulted in an attempt to automate this mode of harvesting of the tobacco crop.

An early manually operated tobacco harvesting machine is the subject of U.S. Pat. No. 2,497,845 to Burkhart which utilized a horizontal cutting disc or circular saw mounted for rotation about a vertical axis and driven by one of a pair of wheels which contact the earth. By pushing the machine, the wheel drives the saw uch that the teeth on the periphery of the circular saw sever in sequence the stalks of the tobacco plants just above the ground. The stalk is guided to the saw for contact with the teeth periphery through laterally opposed, curved guide blades which define a throat or passage to that cutting member. The guide mechanism effects the subsequent disposition of the severed plants to the side of the tobacco harvesting machine as it passes manually down the row. While the Burkhart tobacco harvesting machine constitutes an advance in the industry, and while it eliminates the necessity of the tobacco harvester to use a hand held cutting knife to effect that severance, the machine requires a total manual input to achieve severance and does little to increase the rate of tobacco harvesting. Further attempts have been made to apply a motor driven cutting mechanism to such manually driven machine with the utilization of powered reciprocating cutting teeth and to effect the cutting of plural rows of tobacco. The Gehman et al U.S. Pat. No. 3,436,901 is exemplary of such a manually driven tobacco harvesting machine to accomplish multiple row severance of the tobacco plant. By the use of the Gehman et al machine, it is possible to sever multiple rows and to dispose the plants upon severance, i.e. lay the cut stalk in a somewhat even manner within the row being severed for subsequent pick-up. The severed plants however lie in separate rows and are difficult to pick-up.

It is, therefore, a primary object of the present invention to provide a self-driven, multiple row tobacco harvesting machine which is capable of simultaneously cutting tobacco stalks just above the ground within multiple rows and for laying the several stalks of adjacent multiple rows with their butt ends oriented in a common direction and piled upon each other to facilitate subsequent pick-up with minimal damage to the leaves of the severed stalks.

SUMMARY OF THE INVENTION

The present invention is directed to an improved multiple row tobacco harvesting machine of the type including a laterally stationary frame movable in rolling contact with the ground along several of a plurality of laterally spaced rows of tobacco plants, with the frame including a plurality of vertical support bars which depend from the frame towards the ground at laterally spaced intervals corresponding to the spacing of the rows and for disposition in line therewith. The support bars bear powered cutting discs mounted for rotation about a vertical axis at positions corresponding to the rows and at a height just above the ground for severance of the tobacco plant stalks from their roots just above the ground. Guide members fixed to said supports function to deflect the stalks of the plants of adjacent rows laterally relative to the cutting discs and towards each other. Means are provided for driving of the discs for adjacent rows in given opposite directions such that the plants of adjacent rows upon severance fall with their butt ends directed rearwardly and with the plants of adjacent rows piled on top of each other to facilitate subsequent pick-up.

The machine may constitute a three-wheeled vehicle with a central, rearward wheel, acting as a steered wheel. Paired, vertical support bars forwardly of a rear wheel support individually a pair of front wheels, being shrouded by U-shaped transversely sectioned guide plates for respective disposal outside of a given central pair of tobacco rows over which the frame passes. A common central support bar and two outer vertical support bars, to the rear of those bearing the front wheels, support the cutting discs. A pair of cutting discs are carried by the central vertical support bar and are driven in opposite directions, tending to cut and throw the severed stalks of the two innermost rows towards adjacent outer rows to each side thereof. The guide members comprise triangular shaped guide plates which overlie the respective cutting discs and have their pointed ends disposed forwardly in the direction of machine movement and are inclined rearwardly, outwardly and upwardly so as to lift the leaves and lay the plants subsequent to severance laterally away from respective cutting blades and to facilitate the disposition of the severed butt ends rearwardly by action of the cutting discs and cause plants of adjacent rows to fall on top of each other and along paths defined by the front wheels of the machine.

Preferably, an internal combustion engine is mounted to the machine and drives a hydraulic pump. The machine includes a hydraulic drive motor coupled to the central rear wheel for moving the machine forwardly through the tobacco field. The means for rotating said cutting discs comprise individual hydraulic motors carried on the frame support bars. Angularly adjustable arms are mounted at one end for pivoting about horizontal axes, relative to the support bar and bear the cutting discs at their opposite ends. Belt and pulley means couple the hydraulic drive motors to the cutting discs. Pivoting of the disc support arms about vertical axes permits the discs to be shifted laterally to align the cutting discs with the plants within individual rows to be harvested during the traverse of the machine across the tobacco field and along the rows. Further, the frame preferably comprises transverse beams fixedly mounted to a longitudinally extending chassis forming a platform bearing the support bars for the front wheels and the steerable rear wheel. The support bars for the discs bear brackets at their upper ends which are bolted to the transverse beam, permitting lateral adjustment to further insure alignment of the cutting discs with the given rows of tobacco along the beam and vertical height adjustment of the bars for disc proper cutting height.

BRIEF DESCRIPTION OF THE DRAWINGS

FIG. 3 is a top plan view of the machine of FIGS. 1 and 2.

FIG. 4 is a sectional view of a portion of the machine of FIG. 1 taken about line 4—4 illustrating the nature and make up of the powered cutting discs and their support.

DESCRIPTION OF THE PREFERRED EMBODIMENT

Figure 1:
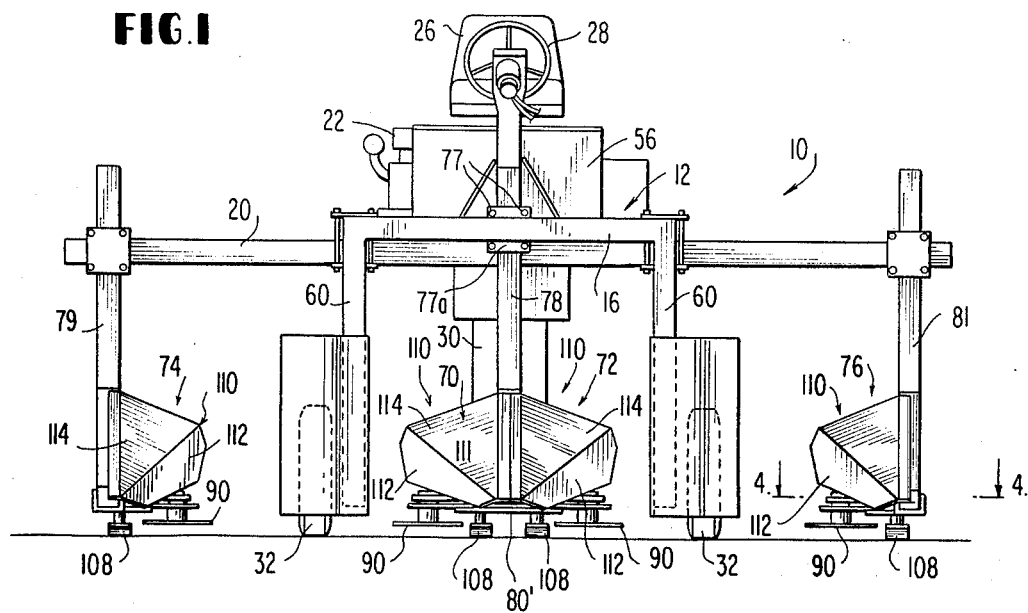
FIG. 1 is a front elevational view of the improved multiple row tobacco harvesting machine of the present invention in a preferred embodiment.
Figure 2:
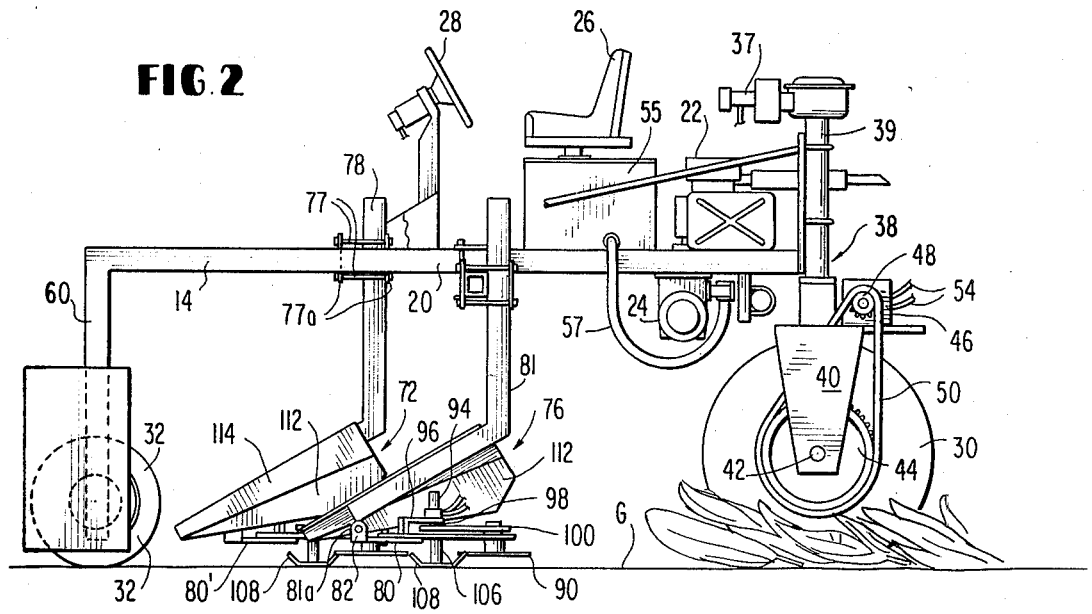
FIG. 2 is a side elevational view of the machine of FIG. 1.

With reference to the drawings, the improved, self-propelled, multiple row tobacco harvesting machine of the present invention is comprised of a frame or chassis indicated generally at 10, which, in turn, is formed of a central boxlike platform as at 12, formed by welding together at their ends laterally opposed longitudinal frame members 14 and transverse end frame members 16. Spanning between the longitudinal frame members intermediate of the transverse end frame members 16 is a forward transverse beam 18 and slightly to the rear of the same a rearward transverse beam 20. Beam 18 is fixedly welded at its ends to the frame members 14. Beam 20 of platform 12 may be bolted to the platform as at 21, spanning the bottom of the platform 12 with its ends extending well to the sides of the platform 12. The platform 12 supports an internal combustion engine 22 with its output driving a hydraulic pump indicated generally at 24 for supplying powered elements of the machine. The operator is supported by a seat 26 on the platform at an intermediate position and preferably in line with the longitudinal axis of the platform 12 at the rear of a steering wheel 28 permitting steering of the powered machine. The machine is supported for traverse over the ground by a steered rear drive wheel 30 and a pair of front wheels 32, although it is obvious the steered wheel could be forward of the non-steered wheels, or alternatively, the chassis could support four wheels rather than three to effect propulsion and driving, it being important that the wheels be disposed at laterally spaced positions corresponding to the spacing between tobacco rows and so as to fall between the rows.

With respect to the steered rear drive wheel 30, it is mounted for rotation about a horizontal axis by a drive wheel post assembly indicated generally at 38, terminating at its lower end in a yoke 40 through which an axle 42 projects and upon which the wheel 30 rotates. In order to effect driving of the machine across the field, the wheel 30 is provided with a drive wheel sprocket 44 which bears a chain 50, the opposite end being coupled to a sprocket 48 of a hydraulic drive motor 46 mounted on the drive wheel post assembly 38 so as to pivot with the post 39 which is mounted for rotation about a vertical axis to the rear of the platform 12. The machine is provided with a plurality of hydraulic lines as at 54 for receiving pressurized hydraulic fluid via a control unit 56 which receives that fluid from the pump 24 through line 57. The various hydraulic motors achieve steering, positive drive of the machine rear wheel 30, and cutting the tobacco plant stalks at ground level, as will be described in detail hereinafter.

In that respect, the hydraulic control unit 56 is at the disposal of the operator in conventional fashion and permits the drive of the hydraulic motors to achieve the desired results and forms no part per se of the present invention.

With respect to the forward or front wheels 32, the platform 12 supports and has welded thereto at its forward corners, depending forward vertical support bars 60 bearing at their lower ends front wheel axles 62 which are mounted for rotation about a horizontal axis and support the rubber tire front wheels 32, the forward pair of vertical support bars being spaced laterally from each other at a distance such that the wheels are disposed to the outside of a central, straddled pair of tobacco rows. The front wheels therefore span two tobacco rows and are positioned between those two rows and adjacent rows to the outside thereof. Each of the forward pair of support bars 60 supports wheel shrouds 64 which are generally U-shaped in transverse cross-section and which take the form of sheet metal plates and are configured such that the shrouds guide the tobacco leaves of the plants to each side thereof as they move along the rows towards the cutting mechanisms carried by the machine rearwardly of the forward wheels 32.

The self-propelled tobacco harvesting machine of the present invention, in the case of the illustrated embodiment, is designed to sever on the same pass, four adjacent rows of tobacco by cutting the tobacco stalks just above the point where they emerge from the ground, to effect automatically the proper alignment of the severed stalks with their butt ends rearwardly and their tops forwardly and to cause the separate stalks of immediately adjacent rows to the sides of the cutting machine longitudinal axis to fall on top of each other such that picking may be facilitated by providing similarly oriented cut stalks in rows numbering one-half of the rows being harvested. In that respect, the machine is provided with four cutting saw assemblies comprising, FIG. 1, left and right side, outboard cutting saw assemblies, generally indicated at 74 and 76, respectively, and left and right side inboard cutting saw assemblies generally indicated at 70 and 72, respectively. Further, while it may be possible to support the individual saw assemblies by separate support bars which are fixed to and depend downwardly from the frame or chassis 10, preferably a single central vertical support bar 78 is provided for supporting both the left and right side, inboard cutting saw assemblies 70 and 72, while outboard vertical support bars 79 and 81 are provided for assemblies 74 and 76, respectively. The vertical support bars 78 are preferably bracket mounted to their transverse beams 79 and 81 for assemblies 70 and 72 near the center of the open platform 12. In this regard, the inboard cutting saw assemblies 70, 72 are oriented slightly forward of the outboard cutting saw assemblies 74, 76 which are mounted to the outboard ends of the rearward transverse beam 20. Each vertical support bar for the saw assemblies terminates in inclined lower ends and are preferably bracket supported to the assembly of the forward transverse beam 18 by means of bolts 77 and bracket plates 77a. The upper ends of the bars may, however, be welded to the transverse beam, where no height adjustment is required for the cutting saw assemblies borne thereby.

The saw assemblies are generally identical, and for assembly 76, a horizontal saw assembly base plate 80 of generally rectangular strip form is pivotably mounted to the inclined lower end of its vertical support bar 81 through right angle bracket 82 and a pivot pin 84 passing therethrough and through a bored hole 86 within projecting portion 81a of bar 81, this permitting the saw assembly base plates 80 to pivot about a horizontal axis. Further, the projection 81 acts as a stop for the pivotable plate 80 to limit pivoting to a generally horizontal position for the rotating disc or circular saw 90 carried thereby. Mounted to the saw assembly base plate 80 is a saw support arm 92 of modified rectangular form and being pivotably mounted for rotation about a vertical axis by way of a connecting bolt 93 which passes through both arm 92 and plate 80, at a point near the end of the plate 80 remote from its pivot connection to the support bar 81. Further, the arm 92 bears an arcuate slot 95 through which passes a second bolt 97, the bolt 97 being loosened to permit the arm 92 to be pivoted, then locked to plate 80 over a limited arcuate extent to cause the cutting disc or rotating saw 90 to pivot laterally outwardly and away from plate 80 or closer to the longitudinal axis of that plate and to a position in alignment therewith. Plate 92 bears a rotary hydraulic drive motor 94 which is fixed to its upper surface by way of a bracket at 96, the motor being connected by way of hydraulic lines 54 to the hydraulic control unit 56 to effect rotation of a motor shaft 98 which bears a drive pulley 99 upon which is carried transmission belt 100. At the outboard end of the arm 92 is mounted a saw support shaft 102 which is mounted for rotation about a vertical axis, the shaft 102 also bearing a driven pulley 104 which also receives the endless belt 100 such that energization of the hydraulic rotary motor 94 causes the cutting disc or rotary saw 90 to rotate at high speed to facilitate the severance of the tobacco stalks above the ground and along the row in alignment with the periphery of that cutting tool and in the path thereof.

In FIG. 4, the position of the stalks is indicated at S as is similarly shown in FIG. 3, while the stalks themselves, upon severance, are caused to fall with their butt ends B rearwardly and in the manner of the present invention, on top of previously cut stalks S' from the stalk of row R2, the four rows along which the machine traverses to effect harvesting of four rows simultaneously and piling of adjacent rows on top of each other after severance with their butt ends rearwardly being indicated at R1, R2, R3 and R4 for assemblies 76, 72, 70 and 74, in that order. In lieu of the pulley and belt coupling between the hydraulic drive motor 94 and the shaft 102, to which the cutting disc 92 is fixed, drive sprockets with a chain connection may be utilized.

As mentioned previously, the assembly base plate 80 pivots about a horizontal axis as defined by pin 84, and while the base plate 80 limits clockwise rotation of that member about the axis of pin 84, the assembly is free to pivot upwardly to some extent and is purposely permitted this movement to permit the deflection of the assembly and particularly the cutting disc 90 when the machine moves over rough terrain. In that regard, a rod 106 depends downwardly from the bottom of the arm 92 and bears at its bottom an earth contact shoe 108 which is in the form of a strip of metal bent upwardly at its forward and rear ends and fixed at its middle to the bottom of the rod 106. While ordinarily the shoe is horizontal, the shoe may by contact with ground G ride on the surface of the ground as the machine moves through the rows of tobacco. However, when the leading edge of the shoe 108 contacts an object over which the assembly must ride, it pivots the base plate 80 and the arm carried thereby upwardly and away from the ground, raising the level of the cutting disc 90 to prevent damage or destruction to the cutting disc.

In order to effect the desired cutting operation and to achieve the laying over of the cut plants properly oriented such that their butt ends face rearwardly of the machine as it traverses across the field in line with the rows of plants to be severed and for effecting multiple row piling of the several stalks, it is required that each of the cutting saw assemblies have an overlying plant leaf guide member or snout. In that regard, outboard cutting saw assembly 76 has a snout or guide member 110 which is formed of sheet metal of generally triangular configuration and bent to form lower and upper integral sidewalls or side sections as at 12 and 14, respectively, joined at their edges. Each snout 110 in plan configuration is trapezoidal, that is, of modified triangular shape with the upper and lower side sections inclined rearwardly, outwardly and upwardly such that the bottom leaves of the plants in the path thereof are lifted and forced outwardly prior to the circular saw 90 severing the stalks from the embedded roots. The hydraulic lines 54 of the drive motor 94 deliver pressurized fluid to cause rotation of the drive motor pulley 98. The hydraulic drive motor 94 comprises a conventional rotary hydraulic motor capable of rotating the cutting disc 90 at relatively high speed, the disc 90 having cutting teeth on its periphery to achieve stalk severance under the principles of the Burkhart machine.

All of the cutting saw assemblies 70, 72, 74 and 76 are similarly formed, mounted in the same fashion, are driven by hydraulic motors in the same manner, and in this case, the guide member snouts are mounted to the side of their vertical support arms towards the laterally and angularly disposed cutting discs of those assemblies to achieve cutting of the stalk at the point where it emerges from the ground after lifting of the leaves and under a combined cutting and guiding operation to achieve disposition of the cut stalks butt end rearwardly, that is, away from the direction of machine movement along the rows and with their cut stalks falling on top of the previously severed stalks from the immediately adjacent inboard tobacco row. For each of the assemblies, like elements bear like numerical designations.

In that respect, left and right outboard vertical support bars 79 and 81 are essentially of the same vertical height as the central bar 78, all of these bars are bracket mounted to their transverse beams by way of bracket members 77a and bolts 77, thus permitting transverse or lateral and vertical adjustability of the cutting saw assemblies relative to each other.

Cutting assembly 74 is a mirror image of cutting assembly 76, as may be readily seen in FIGS. 1 and 3. Similarly, cutting saw assembly 70 is identical to cutting saw assembly 76 and is the mirror image of that of cutting assembly 72, with the exception in this case, since the assemblies 70 and 72 are borne by a common vertical support bar 78, preferably a unitary base plate 80' is provided commonly to both assemblies, the plate being pivoted to arm 78 in the manner in which plate 80 is pivoted to bar 81 at its lower, inclined end. Further, while cutting assemblies 70 and 72 each have a snout 110 which are mirror images of each other, and are fixed to the bar 78, and extend along the inclined portion of the upper face of the inclined portion of that member and have edges abutting as at 111, a unitary snout may be formed of a single sheet of metal bent to provide four integral triangular sections instead of sections 112 and 114 for each of these members, as seen in FIG. 1. Paired shoes 108 are provided for causing deflection about a horizontal pivot axis for the unitary base plate 80' for the pair of central cutting assemblies.

A very important aspect of the present invention is the requirement that the cutting discs for the various cutting saw assemblies rotate in a predetermined direction so as to effect the cutting of the stalks and the subsequent orienting and piling of the severed stalks guided by the guide means overlying these cutting discs. The severed plants of adjacent rows pile on top of each other, their butt ends all facing in the same direction, in this case rearwardly in a direction opposite to the direction of movement of the machine traversing along the rows and across the tobacco field. In that respect, from the driver's position and facing forward, there is a requirement that the cutting disc 90 of the right side outboard cutting saw assembly 76 rotate counterclockwise, the right side inboard cutting saw assembly disc rotate clockwise, the left side inboard cutting saw assembly cutting disc rotate counterclockwise, and the left side outboard cutting saw assembly cutting disc rotate clockwise. The hydraulic saw drive motor in each instance is properly set to achieve the required direction of rotation for the saw driven thereby. Each circular saw is therefore required to sever the plant and at the same time throw the bottom of the severed plant adjacent to the cutting line away from its path of movement and rearwardly, guided by the guide members associated therewith, with the net effect being to pile the severed plants from immediately adjacent and laterally confronting rows on top of each other with their butt ends commonly directed rearwardly. Succeeding equipment, preferably automated, picks up the severed plants from the ground with minimal bruising and damage to the leaves, facilitating low-cost harvesting of the product. Further, while preferably the outboard cutting saw assemblies are offset slightly rearwardly with respect to the inboard cutting saw assemblies to sever, first the inboard row and causing these plants to fall prior to severing the plants of the adjacent outboard row and effecting their piling on top of the severed plants of the inboard row, it is possible to both reverse this orientation, that is, to cause the inboard cutting assemblies to trail the the outboard cutting assemblies.

Further, while the machine is shown as employing the hydraulic motors for driving of the cutting discs of the individual cutting saw assemblies, it is obvious that electrically powered motors may be achieved in lieu of hydraulic motors or that direct drive of the cutting discs may be achieved from a central location rather than utilizing individual drive motors at the location of the cutting discs driven thereby.

While the invention has been particularly shown and described with reference to a preferred embodiment thereof, it will be understood by those skilled in the art that various changes in form and details may be made therein without departing from the spirit and scope of the invention.

What is claimed is:

1. An improved multiple row tobacco harvesting machine comprising:
   a laterally stationary frame movable in rolling contact with the ground along several of a plurality of laterally spaced rows of tobacco plants,
   a plurality of vertical support bars,
   means for supporting said plurality of laterally spaced, vertical support bars from said frame at laterally spaced intervals corresponding to the spacing of the tobacco plant rows,
   cutting saw assemblies carried by said vertical support bars at their lower ends, above the surface of the ground, said cutting saw assemblies comprising cutting discs mounted for rotation about vertical axes at positions corresponding to said rows for severance of said plants just above said ground surface,
   guide members affixed to said support bars and having portions for adjacent rows which extend from a point in advance of said cutting discs to positions laterally aligned with the axis of rotation of said discs for deflection of said plants of said adjacent rows towards each other and for lifting the leaves vertically upwardly, and
   means for driving said discs for said cutting assemblies for adjacent rows in given opposite directions to cause, along with the deflection of said plants by said guide members, plants of adjacent rows, upon severance, to fall with their butt ends extending rearwardly, on top of each other to form rows of severed tobacco plants numbering one-half of the rows being harvested to facilitate subsequent pick-up of the severed plants.

2. The machine as claimed in claim 1, wherein said vertical support bars for said cutting assemblies for given adjacent parallel rows are mounted to said frame at longitudinally spaced positions such that one of said cutting assemblies effects cutting of the plants of one of said adjacent rows just prior to the cutting of the plants of the other of said rows by the other cutting saw assembly of the adjacent row, such that the plants cut by the assembly on the forward support bar are covered by plants severed by the cutting saw assembly of the rearwardly positioned vertical support bar.

3. The machine as claimed in claim 1, wherein said guide members for each of said cutting saw assemblies comprise unitary sheet metal guide plates overlying the cutting discs and extending forwardly thereof in the direction of frame movement, said guide plates being formed of upper and lower side sections which are inclined rearwardly, outwardly and upwardly such that the leaves of the plants in the path of the cutting saw assemblies are lifted and said severed plants are guided by contact with the guide plate when thrown laterally and rearwardly by the momentum of the cutting discs during severance, such that the butt ends of the severed plants are directed away from the direction of movement of the machine along the rows to form piled severed plant rows intermediate of the path of advance adjacent oppositely oriented cutting saw assemblies.

4. The machine as claimed in claim 2, wherein said guide members for each of said cutting saw assemblies comprise unitary sheet metal guide plates overlying the cutting discs and extending forwardly thereof in the direction of frame movement, said guide plates being formed of upper and lower side sections which are inclined rearwardly, outwardly and upwardly such that the leaves of the plants in the path of the cutting saw assemblies are lifted and said severed plants are guided by contact with the guide plate when thrown laterally and rearwardly by the momentum of the cutting discs during severance, such that the butt ends of the severed plates are directed away from the direction of movement of the machine along the rows to form piled severed plant rows intermediate of the path of advance adjacent oppositely oriented cutting saw assemblies.

5. The machine as claimed in claim 1, wherein for each of said cutting saw assemblies, a base plate is mounted to the lower end of its vertical support bar for pivoting about a horizontal axis, a cutting saw support arm is mounted to said base plate for pivoting about a vertical axis at a point along said base plate remote from said horizontal pivot axis, each assembly includes means for locking said pivotable arm to said base plate at an angularly adjusted position with respect thereto, a drive motor is mounted to said saw support arm, said cutting disc is mounted to said arm for rotation about a vertical axis, and belt and pulley drive means are carried by said arm and drivingly couple said cutting disc to said drive motor such that rotation of said drive motor causes said disc to rotate about its axis to effect severance of the stalk in a given row and a ground contact shoe fixed to the bottom of said base plate contacts with the ground to define the vertical height of said cutting disc during traverse of said machine and causes said base plate and said cutting disc carried thereby to pivot about said horizontal pivot axis in response to varying contour of the ground surface over which said shoe traverses.

6. The machine as claimed in claim 2, wherein for each of said cutting saw assemblies, a base plate is mounted to the lower end of its vertical support bar for pivoting about a horizontal axis, a cutting saw support arm is mounted to said base plate for pivoting about a vertical axis at a point along said base plate remote from said horizontal pivot axis, each assembly includes means for locking said pivotable arm to said base plate at an angularly adjusted position with respect thereto, a drive motor is mounted to said saw support arm, said cutting disc is mounted to said arm for rotation about a vertical axis, and belt and pulley drive means are carried by said arm and drivingly couple said cutting disc to said drive motor such that rotation of said drive motor causes said disc to rotate about its axis to effect severance of the stalk in a given row and a ground contact shoe fixed to the bottom of said base plate contacts with the ground to define the vertical height of said cutting disc during traverse of said machine and causes said base plate and said cutting disc carrier thereby to pivot about said horizontal pivot axis in response to varying contour of the ground surface over which said shoe traverses.

7. The machine as claimed in claim 3, wherein for each of said cutting saw assemblies, a base plate is mounted to the lower end of its vertical support bar for pivoting about a horizontal axis, a cutting saw support arm is mounted to said base plate for pivoting about a vertical axis at a point along said base plate remote from said horizontal pivot axis, each assembly includes means for locking said pivotable arm to said base plate at an angularly adjusted position with respect thereto, a drive motor is mounted to said saw support arm, said cutting disc is mounted to said arm for rotation about a vertical axis, and belt and pulley drive means are carried by said arm and drivingly couple said cutting disc to said drive motor such that rotation of said drive motor causes said disc to rotate about its axis to effect severance of the stalk in a given row and a ground contact shoe fixed to the bottom of said base plate contacts with the ground to define the vertical height of said cutting disc during traverse of said machine and causes said base plate and said cutting disc carried thereby to pivot about said horizontal pivot axis in response to varying contour of the ground surface over which said shoe traverses.

8. The machine as claimed in claim 4, wherein for each of said cutting saw assemblies, a base plate is mounted to the lower end of its vertical support bar for pivoting about a horizontal axis, a cutting saw support arm is mounted to said base plate for pivoting about a vertical axis at a point along said base plate remote from said horizontal pivot axis, each assembly includes means for locking said pivotable arm to said base plate at an angularly adjusted position with respect thereto, a drive motor is mounted to said saw support arm, said cutting disc is mounted to said arm for rotation about a vertical axis, and belt and pulley drive means are carried by said arm and drivingly couple said cutting disc to said drive motor such that rotation of said drive motor causes said disc to rotate about its axis to effect severance of the stalk in a given row and a ground contact shoe fixed to the bottom of said base plate contacts with the ground to define the vertical height of said cutting disc during traverse of said machine and causes said base plate and said cutting disc carried thereby to pivot about said horizontal pivot axis in response to varying contour of the ground surface over which said shoe traverses.

9. An improved multiple row tobacco harvesting machine comprising:

an open frame, laterally spaced, longitudinally extending frame members and transverse end frame members welded thereto and extending therebetween and defining a rectangular open frame platform, a first transverse beam extending between said longitudinal frame members and fixed thereto and being spaced from said end frame members, a second transverse beam spanning across said longitudinal frame member, spaced longitudinally from said first transverse beam and terminating at each end, beyond respective longitudinal frame members, first vertical support bars fixed to said frame member on opposite sides thereof and supporting respectively front wheels for rotation about horizontal axes, a steerable wheel mounted along the platform longitudinal center line to said platform frame member remote from said vertical support bars bearing said front wheels, means for powering said steerable wheel to effect traversal of said platform along several of a plurality of laterally spaced rows of tobacco plants, second vertical support bars including a central vertical support bar mounted to said first transverse beam in line with the longitudinal axis of said platform and each of said second vertical support bars terminating in forwardly and downwardly inclined forward ends, and paired outboard vertical support bars mounted to said second transverse beam outside of said platform, plural cutting saw assemblies mounted to said second vertical support bars including a plate pivotably mounted to the lower end of the inclined portion of each of said second vertical support bars for pivoting about a horizontal axis, at least one cutting saw support arm pivotably mounted to said base plate rearwardly of said horizontal pivot axis for pivoting about a vertical axis, means for adjustably, angularly fixing said arm angularly outwardly of the longitudinal center line of said base plate and to a given side thereof, a cutting disc mounted to each arm at the end remote from said vertical pivot axis for said arm for rotation about a vertical axis for severance of said plants just about the ground surface, a triangular shaped, sheet metal guide plate overlying each cutting disc and extending forwardly thereof in the direction of frame movement and being formed of upper and lower side sections inclined rearwardly, outwardly and upwardly to a given side of said second support arm bearing the same, and means for driving said discs for said cutting assemblies for adjacent rows in given opposite directions such that the leaves of the plants in the path of the cutting discs are lifted and the severed plants are guided by contact with the guide plates as the butt ends of the plants are thrown laterally and rearwardly of said assemblies of the momentum of the cutting during severance, such that the butt ends of the severed plants are directed away from the direction of movement of the machine from opposed sides of respective cutting assemblies for said adjacent rows to form piled severed plant rows intermediate of the path of advance of adjacent oppositely oriented cutting saw assemblies.

* * * * *